(12) United States Patent
Meagher et al.

(10) Patent No.: US 7,688,560 B2
(45) Date of Patent: Mar. 30, 2010

(54) OVERLOAD PROTECTION METHOD

(75) Inventors: Thomas Bruce Meagher, Houston, TX (US); Kenneth John Murphy, Henderson, NV (US); Linda M. Murphy, legal representative, Henderson, NV (US)

(73) Assignee: ICS Triplex Technology Limited, Essex (GB)

( * ) Notice: Subject to any disclaimer, the term of this patent is extended or adjusted under 35 U.S.C. 154(b) by 355 days.

(21) Appl. No.: 11/689,691

(22) Filed: Mar. 22, 2007

(65) Prior Publication Data

US 2008/0019066 A1    Jan. 24, 2008

Related U.S. Application Data

(60) Provisional application No. 60/785,537, filed on Mar. 24, 2006.

(30) Foreign Application Priority Data

May 31, 2006    (EP)    ................................... 06114805

(51) Int. Cl.
    *H02H 3/00*    (2006.01)
(52) U.S. Cl. ......................................................... 361/79
(58) Field of Classification Search .................... 361/79
    See application file for complete search history.

(56) References Cited

U.S. PATENT DOCUMENTS

| 4,402,028 | A | * | 8/1983 | Udren ........................ 367/36 |
| 4,535,378 | A |   | 8/1985 | Endo et al. |
| 4,539,683 | A |   | 9/1985 | Hahn et al. |
| 4,679,028 | A |   | 7/1987 | Wilson |

(Continued)

FOREIGN PATENT DOCUMENTS

DE    19750349    5/1998

(Continued)

OTHER PUBLICATIONS

European Search Report for European Application 06114802.9, Sep. 5, 2006, European Patent Office.

(Continued)

*Primary Examiner*—Fritz M. Fleming
*Assistant Examiner*—Lucy Thomas
(74) *Attorney, Agent, or Firm*—Boyle Fredrickson LLP; William R. Walbrun (57) ABSTRACT

This invention relates to overload protection for a circuit driving a direct current (DC) load. The invention provides a method of generating an overload condition for an output module driving a load having a load current and a load voltage comprising the steps of: monitoring the load current at sample intervals; comparing the monitored load current to a predetermined load current threshold; starting an overload timer in the event that the timer is not running and the monitored load current is greater than said load current threshold; monitoring the load voltage at said sample intervals; generating a ramped load voltage waveform for reference purposes in dependence upon an initial load voltage and a predetermined step size load voltage in the event that the overload timer is running; generating an overload condition in the event that the monitored load voltage is less than said ramped load voltage reference waveform, the ramped load voltage is less than a predetermined positive ramp limit and the overload timer is running.

4 Claims, 6 Drawing Sheets

U.S. PATENT DOCUMENTS

| | | | |
|---|---|---|---|
| 5,128,625 A | | 7/1992 | Yatsuzuka et al. |
| 5,159,519 A | * | 10/1992 | Cassidy et al. ............... 361/96 |
| 5,293,082 A | | 3/1994 | Bathaee |
| 5,324,989 A | | 6/1994 | Thornton et al. |
| 5,552,881 A | | 9/1996 | Jezwinski et al. |
| 5,594,439 A | | 1/1997 | Swanson |
| 5,621,603 A | | 4/1997 | Adamec et al. |
| 5,774,321 A | | 6/1998 | Kim et al. |
| 5,867,014 A | | 2/1999 | Wrathall et al. |
| 5,896,263 A | | 4/1999 | Terdan et al. |
| 5,909,660 A | | 6/1999 | Foote et al. |
| 6,061,006 A | | 5/2000 | Hopkins |
| 6,118,642 A | * | 9/2000 | Benenati et al. ............... 361/89 |
| 6,125,024 A | | 9/2000 | LeComte et al. |
| 6,320,283 B1 | | 11/2001 | Salim et al. |
| 6,351,835 B1 | | 2/2002 | Sakaguchi |
| 6,400,163 B1 | | 6/2002 | Melcher et al. |
| 6,459,599 B1 | | 10/2002 | Agirmann et al. |
| 6,557,131 B1 | | 4/2003 | Arabi |
| 6,594,129 B1 | | 7/2003 | Baba et al. |
| 6,653,963 B1 | | 11/2003 | Barrenscheen et al. |
| 6,657,464 B1 | | 12/2003 | Balardeta et al. |
| 6,768,350 B1 | | 7/2004 | Dickey |
| 2003/0043521 A1 | | 3/2003 | Thiele |
| 2003/0063679 A1 | | 4/2003 | Scrofano |
| 2004/0125007 A1 | | 7/2004 | Pezzini |
| 2005/0135037 A1 | | 6/2005 | Thiery et al. |
| 2005/0154945 A1 | | 7/2005 | Haag et al. |
| 2005/0174273 A1 | | 8/2005 | Luo et al. |
| 2005/0248477 A1 | | 11/2005 | Jongsma et al. |
| 2006/0061303 A1 | | 3/2006 | Takeda et al. |
| 2007/0285031 A1 | * | 12/2007 | Shteynberg et al. ......... 315/294 |

FOREIGN PATENT DOCUMENTS

| | | |
|---|---|---|
| EP | 0325786 | 8/1989 |
| EP | 0789458 | 8/1997 |
| EP | 1322139 | 6/2003 |
| EP | 1545163 | 6/2005 |
| JP | 55096708 | 7/1980 |
| JP | 60236073 | 1/1985 |
| JP | 08023244 | 1/1996 |
| WO | WO03107019 | 12/2003 |

OTHER PUBLICATIONS

European Search Report For European Application 06114803.7, Sep. 1, 2006, European Patent Office.

European Search Report For European Application 06114806.0, Aug. 30, 2006, European Patent Office.

European Search Report For European Application 06114800.3, Sep. 1, 2006, European Patent Office.

European Search Report For European Application 06114804.5, Aug. 18, 2006, European Patent Office.

European Search Report For European Application 06114805.2, Aug. 24, 2006, European Patent Office.

European Search Report For European Application 06114801.1, Sep. 11, 2006, European Patent Office.

Sigma-Delta-ADC in Software, Design&Elektronik, Product Brochure, 1998, pp. 1-18, XP002398239.

* cited by examiner

OVERLOAD PROTECTION METHOD

CROSS-REFERENCE TO RELATED APPLICATIONS

This application is related to and claims priority from U.S. Provisional Application No. 60/785,537 filed Mar. 24, 2006 entitled Fault Detection and Apparatus, which is incorporated fully herein by reference.

BACKGROUND a. Field of the Invention

This invention relates to overload protection for a circuit driving a direct current (DC) load, in particular it relates to overload protection for output drive modules for safety control systems. The invention allows for maximum output load driving capability while retaining protection for the driving circuit.

In safety control systems, fault tolerance is of utmost importance. Fault tolerance is the ability to continue functioning in the event of one or more failures within the system.

Fault tolerance may be achieved by a number of different techniques, each with its specific advantages and disadvantages. One example of fault tolerance is known as Hardware Implemented Fault Tolerance (HIFT). HIFT means that the system relies on robust hardware circuits (as opposed to complex software algorithms) to perform the fault detection and redundancy management functions. A significant advantage HIFT has over software-implemented fault tolerance is that HIFT eliminates the overhead for communications between processors, leaving more time for controlling the process. This makes HIFT systems significantly faster and more dependable than systems using software-implemented fault tolerance.

An example of a HIFT system is a system which provides redundancy, in particular Triple Modular Redundancy (TMR). Using TMR, critical circuits are triplicated and perform identical functions simultaneously and independently. The data output from each of the three circuits is voted in a majority-voting circuit, before affecting the system's outputs. If one of the triplicated circuits fails, its data output is ignored. However, the system continues to output to the process the value (voltage, current level, or discrete output state) that agrees with the majority of the functional circuits. TMR provides continuous, predictable operation.

HIFT and TMR provides for automatic fault recovery with no disruption to system operation and ensures minimal fault detection periods.

Another approach to fault tolerance is the use of hot-standby modules. This approach provides a level of fault tolerance whereby the standby module maintains system operation in the event of module failure. With this approach there may be some disruption to system operation during the changeover period if the modules are not themselves fault-tolerant.

Fault tolerant systems ideally create a Fault Containment Region (FCR) to ensure that a fault within the FCR boundary does not propagate to the remainder of the system. This enables multiple faults to co-exist on different parts of a system without affecting operation.

Fault tolerant systems generally employ dedicated hardware and software test and diagnostic regimes that provide very fast fault recognition and response times to provide a safer system.

Commonly, it is possible to repair faults without interrupting system operation (known as hot replacement). For example active and standby module may operate in parallel so that if an active module becomes faulty there is an automatic change over to a standby module.

Safety control systems are generally designed to be 'fail-operational/fail-safe'. Fail operational means that when a failure occurs, the system continues to operate: it is in a fail-operational state. The system should continue to operate in this state until the failed module is replaced and the system is returned to a fully operational state.

An example of fail safe operation occurs, for example if, in a TMR system, a failed module is not replaced before a second failure in a parallel circuit occurs, the second failure should cause the TMR system to shut down to a fail-safe state.

Typical safety control applications include emergency and safety shutdown systems, process control, reactor control, wellhead control, turbine and compressor control, fire and gas detection and abatement, and are applicable to many industries including oil and gas production and refining, chemical production and processing, power generation, paper and textile mills and sewage treatment plants.

SUMMARY OF THE INVENTION

According to the invention there is provided a method of generating an overload condition for an output module driving a load having a load current and a load voltage comprising the steps of: monitoring the load current at sample intervals; comparing the monitored load current to a predetermined load current threshold; starting an overload timer in the event that the timer is not running and the monitored load current is greater than said load current threshold; monitoring the load voltage at said sample intervals; generating a ramped load voltage waveform for reference purposes in dependence upon an initial load voltage and a predetermined step size load voltage in the event that the overload timer is running; generating an overload condition in the event that the monitored load voltage is less than said ramped load voltage reference waveform, the ramped load voltage is less than a predetermined positive ramp limit and the overload timer is running.

Preferably, the predetermined ramp value is a function of an initial value of said monitored load voltage when said overload time is started.

In a preferred embodiment the method further comprises the steps of: setting a voltage max flag in the event that the ramped load voltage reaches a predetermined positive max voltage; generating an overload condition in the event that the monitored load voltage is less than a predetermined negative ramp limit, the voltage max flag is set and overload timer is running.

Preferably, the method further comprises the step of: generating an overload condition in the event that the monitored load current is greater than said load current threshold and said timer exceeds a predetermined time limit.

BRIEF DESCRIPTION OF THE DRAWINGS

The invention will now be described, by way of example only, with reference to the accompanying drawings in which.

DETAILED DESCRIPTION

Figure 1:
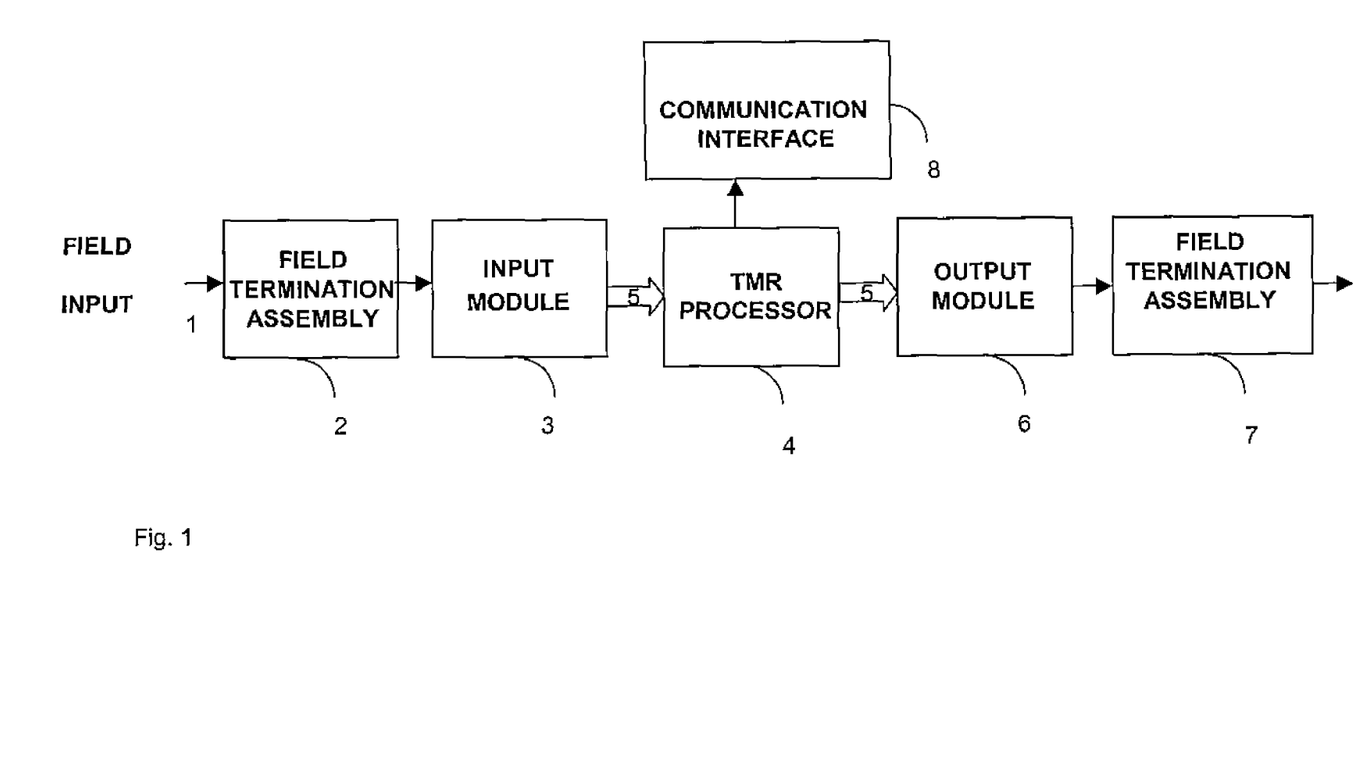
FIG. 1 illustrates schematically a fault tolerant architecture.

Referring now to FIG. 1, signals 1 from an input field device (not shown) are connected to the system via an input Field Termination Assembly (FTA) 2. An input 3 module receives, buffers and carries out any necessary conversion of the input data from the field device. The input data is then transmitted over a triplicated Inter-Module Bus (IMB) 5 to a TMR processor 4. Triplicated microprocessors of the TMR processor receive the input data from each channel of the IMB 5 and carry out a majority vote of the data. During data processing, each of the three processors compares and majority votes its input data against that of the other two processors. The processors synchronously execute the application program, and the derived output data is transmitted back to the IMB. An output module 6 receives, majority votes, and carries out any necessary conversion of the output data from the TMR processor 4. The output circuits are then driven by the majority-voted command. The output signals are connected to a field device (not shown) via an output FTA 7. A communications interface 8 provides facilities to allow systems to be networked using peer to peer communications links, the collection of Sequence of Events (SOE) data, and connection to other systems.

If an internal circuit in the system fails, it is simply voted out. Comprehensive distributed voting both out-votes failures, preventing them from being propagated into the process, and simplifies the process of identifying where faults have occurred.

Figure 2:
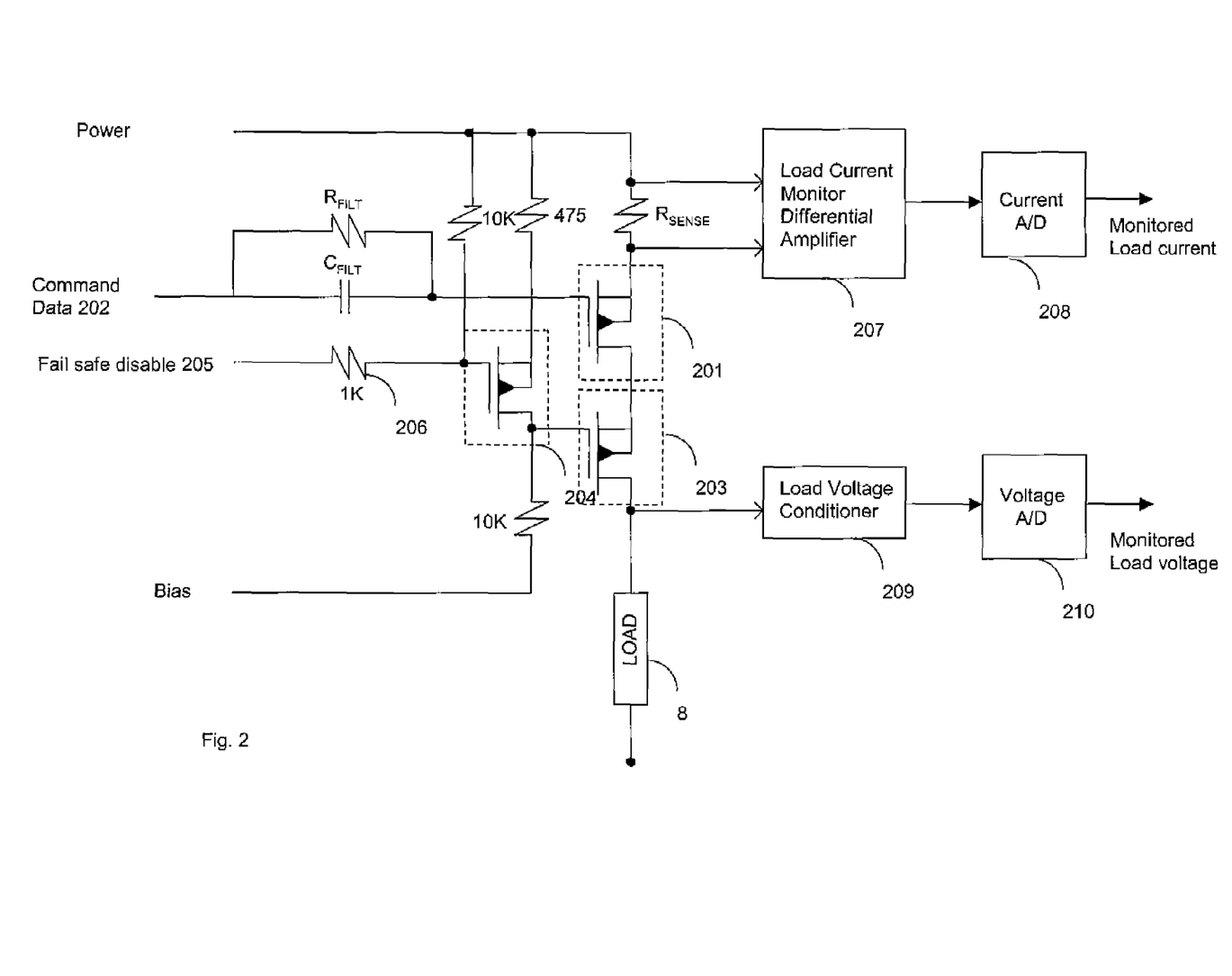
FIG. 2 illustrates a digital output channel fail-safe switch.

FIG. 2 illustrates a digital output channel fail safe switch. A field effect transistor (FET) 201 is driven with a command signal 202. When the command signal 202 is high the FET 201 is off and when the command signal 202 is low the FET 201 is on.

FETs 203, 204 are used as a fail safe disable and are driven by a fail safe signal 205. Resistor 206 provides fault current limiting and the fail safe signal 205 is routed through an inverter circuit comprising FET 204 so that when the fail safe signal is low the FET 203 is off and when the fail safe signal 205 is high the FET 203 is on.

Current monitor outputs connected each side of resistor $R_{SENSE}$ are processed by a load current differential amplifier 207 to provide a signal at a suitable level for an analogue to digital (A/D) circuit 208 used for monitoring the current through the switches. The A/D circuit 208 produces the digital monitored load current value for use in the overload controller of the present invention.

A voltage monitor output is connected to a voltage conditioner 209 to provide a signal at a suitable level for a voltage A/D circuit 210. The A/D circuit 210 produces the digital monitored load voltage value for use in the overload controller of the present invention.

The bias signal is driven to be at least 6V lower than a power rail supplying power to the output controller.

In the case of a digital output module driving DC loads it is necessary to energise loads with high turn-on currents, such as many solenoids, flashers, lamps, etc. ideally the output module should be able to energise the highest surge current load possible, without compromising the self-protection behaviour of the output module in overload situations such as short circuits or loads with extremely high prolonged turn-on current characteristics such as very large capacitors.

In prior art systems output load current is monitored every so often. In fact an overload controller scans a number of channels on a cyclic basis. An overload current condition is generated if monitored load current exceeds a predetermined threshold value for a single scan. This is a very conservative approach which may cause unnecessary module shutdown. Any load that is low impedance during turn-on, for example a capacitive load, may cause a premature overload current condition.

In an improved method load current and, in a preferred embodiment, load voltage is monitored in real time as a load is being energised.

Furthermore, the digitised monitored load current, for a 24V digital output module has a range of just 1.5 amps full scale, above which it saturates to all 1's. The actual load current, of course, continues to increase beyond there, but this cannot be observed in the digitised value because it is already as high as it can go. Monitoring the behaviour of the load voltage provides an advantage over prior art methods because it does not saturate. The digitised current range is set to only 1.5 amps, instead of say, 15 amps, because it is desirable to keep it as sensitive as possible for being able to measure low load currents accurately.

An overload controller continuously evaluates whether or not there is an overload condition present which requires the turn-on operation to be aborted.

The improved method allows the monitored load current to exceed a predetermined overload current threshold as long as other conditions are met for example:

after turn-on, the monitored load current must decay to below the predetermined threshold within a predetermined time period.

after turn-on, the monitored voltage value must increase faster than a predetermined rate, said rate being a function of the voltage across the switch, and within the pre-determined time period.

after turn-on, the monitored voltage must never decrease, once it is outside said predetermined range and within said predetermined time period.

The improved method allows for a longer duration of high amplitude current during turn-on, provided that the voltage is increasing at a reasonable rate and in the preferred embodiment provided that the voltage does not decrease after the voltage has reached a predetermined ramp limit voltage with the voltage across the switch being below a threshold value which will not result in steady state damage to the output FET's.

Figure 3:
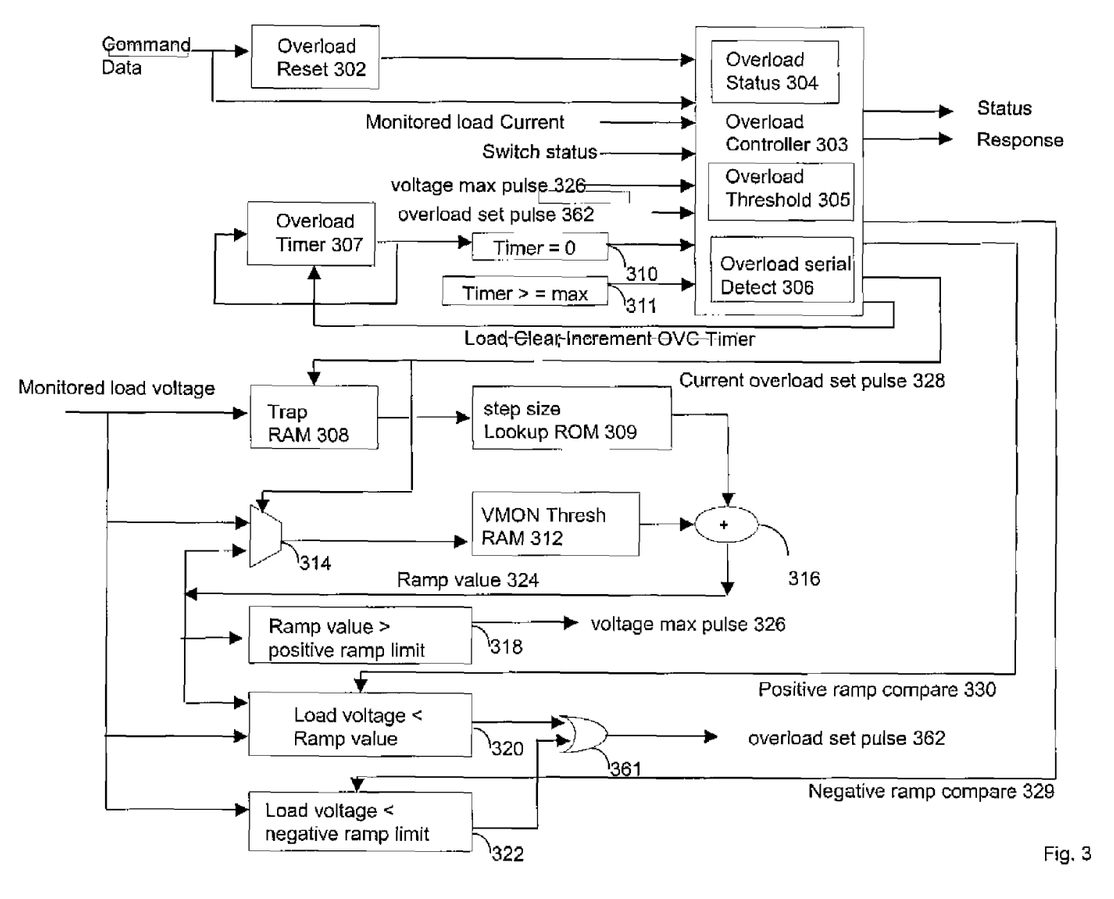
FIG. 3 illustrates architecture for an apparatus according to the present invention.

FIG. 3 illustrates the enhanced overload control architecture. In the preferred embodiment the architecture provides for eight channels and the random access memories (RAMs) are addressed by the channel number i.e. zero to seven. The channels are scanned sequentially such that each channel is monitored every 153.6 μs, referred to herein as a sample period.

For simplicity only one channel is illustrated in FIG. 3. An overload controller 303 comprises an overload status bit 304 an overload threshold register 305 which contains a predetermined overload current threshold represented by four bits, corresponding to the most significant bits of the monitored load current value, and an overload serial detector 306. The current A/D converter 208 has a serial output and comparison with the value in the overload threshold register 305 is carried out on the serial data by the overload serial detector 306.

The value in the overload threshold register 305 may be reduced to a lower value in order to carry out testing the output transistors by a background process, not pertinent to this invention.

The overload controller 303 receives data from the current A/D indicating a monitored load current every sample period.

The overload controller 303 also receives data indicating whether the output module is enabling a DC output current though the load (i.e. switched on) or disabling a DC output current though the load (i.e. switched off).

An overload reset 302 comprises a single bit. When the overload reset bit 302 is changed from a zero to a one the overload status bit 304 in the overload controller 303 is reset and an overload timer 307 is cleared.

The overload timer 307 comprises six bits and serves to count the number of samples since the monitored load current exceeded the predetermined overload current threshold.

An updated overload timer value is then stored into RAM (not shown) after each sample period for retrieval during the next scan. Two comparators 310, 311 are used. Comparator 310 detects when the overload timer=zero and comparator 311 detects when the overload timer is greater than or equal to a maximum value indicating a predetermined maximum time limit. When the timer has reached the maximum value, the monitored load current must be less than the overload threshold. If not the overload status bit is set and the output controller causes the output current to be disabled by negating the command data (FIG. 2, 202) to the top FET.

Figure 4:
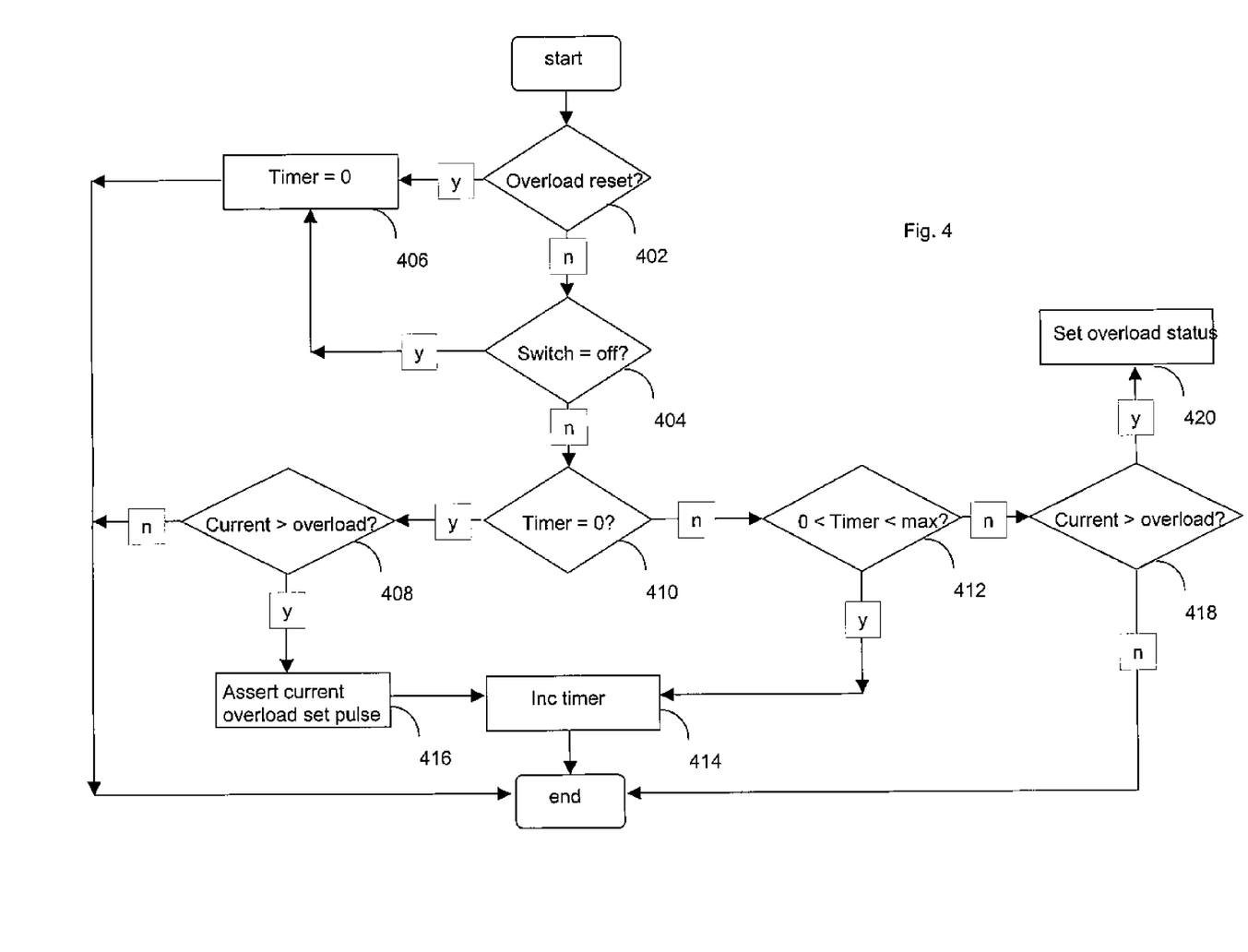
FIG. 4 is a flow chart illustrating method of operation of an overload timer.

Each sample period the overload timer 307 operates as illustrated in FIG. 4. At step 402 a check is made to determine whether an overload reset 302 has occurred. At step 404 a check is made to check whether the switch is off.

If the switch is off or an overload reset has occurred then the overload timer 307 is set to zero at step 406.

If no overload reset has occurred and the switch is on then at step 410 the timer 307 is compared to zero. If the timer 307 is equal to zero (i.e. the timer is not already running) then at step 408 the monitored load current is compared to the overload threshold 305. If the monitored load current is greater than the overload current threshold then at step 416 a current overload set pulse 328 is asserted and at step 414 the timer is incremented. If the timer is already running at step 410 then at step 412 the timer is compared to the maximum value indicating the predetermined maximum time limit. If the timer has not reached the maximum value then at step 414 the time is incremented.

If the timer has reached the maximum value then at step 418 the monitored load current is compared to the overload current threshold 305. If the monitored load current is greater than the overload threshold then at step 420 the overload status bit 304 is set.

Figure 5:
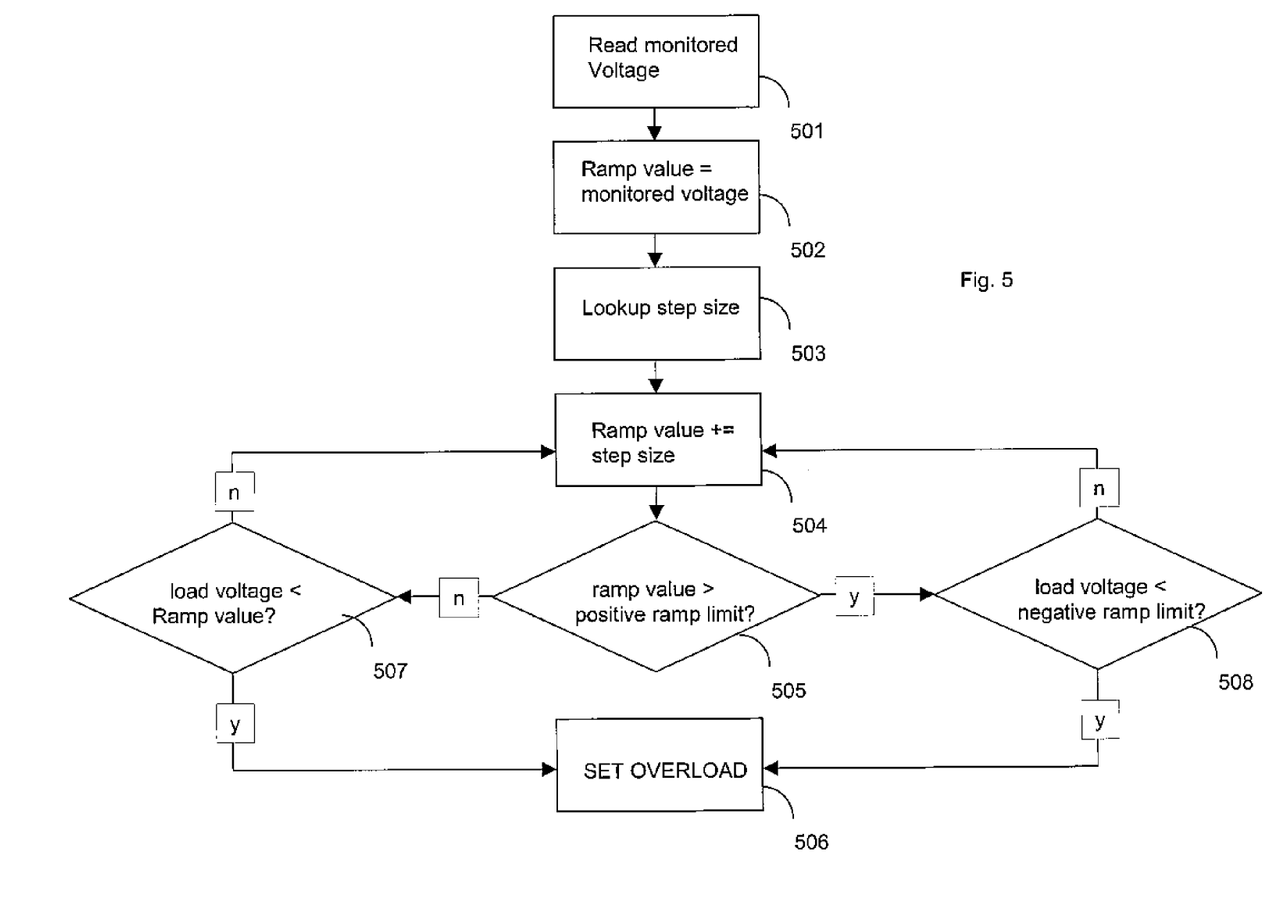
FIG. 5 is a flow chart illustrating method of operation in the event that an overload current is detected.

Referring back to FIG. 3 with reference to the flow chart shown in FIG. 5, in response to the current overload set pulse 328 generated by the overload controller 303, a trap random access memory 308 reads the most significant five bits of a twelve bit monitored load voltage at step 501. This trap value is used to access a read only memory 309 to determine a nine bit step size at step 502.

The trap random access memory 308 simply stores the monitored load voltage at the time of the start of the overload event (the start is determined by detecting the monitored current becoming greater than the overload current threshold 305 and setting the current overload set pulse).

This trapped monitored voltage A/D value is used to point to a step size value which is used to define a load voltage ramp rate value which must be attained to satisfy a load voltage ramp up requirement necessary to keep the total power dissipation in the output FET's within a safe limit for them for the duration of the turn-on event.

A higher voltage across the switch requires a faster increment to protect the FETs 201, 203 (FIG. 2) from damage because there will be more power dissipated in them, and hence they cannot withstand a given load current for as long a time.

Note the more voltage there is across the load, the less voltage there is across the switch.

When the current overload set pulse 328 is asserted, a multiplexer 314 causes a threshold random access memory 312 to read the twelve bit monitored voltage at step 502. This is the starting value for the reference voltage monitor ramp signal which is to be generated in subsequent scans, and against which the actual voltage monitor values are compared.

The threshold random access memory 312 stores a computed ramp value below which the actual monitored load voltage signal may not dip.

The latest ramp value stored in the threshold memory 312 is added to the step size read from the read only memory 309 by an adder 316 to generate a new ramped value 324 at step 504.

When the overload set pulse is disabled the multiplexer 314 causes the threshold random access memory 312 to read the ramped load voltage 324 in order to update the value in the threshold memory 312 to the latest value.

Three comparators 318, 320, 322 serve to determine whether the overload status bit 304 should be set.

AT step 505 comparator 318 compares the ramped load voltage to a predetermined positive ramp limit. In a preferred embodiment the positive ramp limit is set to 4.4V below the top rail.

In the event that the ramped load voltage exceeds the predetermined positive ramp limit a signal monitored voltage max 326 (the output of comparator 318) is asserted and sent to the controller 303. The controller 303 then asserts a signal negative ramp compare 329. In the event that the signal monitored voltage max 326 is not asserted the controller 303 asserts a signal positive ramp compare 330

If the signal positive ramp compare 330 is asserted then comparator 320 compares the monitored load voltage with the ramped load reference voltage 324 at step 507. If the monitored load voltage is less than the ramped load voltage reference created in step 504 then the monitored load voltage is not increasing fast enough and the overload status bit 304 should be set at step 506.

If the signal negative ramp compare 328 is asserted then the comparator 322 compares the monitored load voltage with a predetermined negative ramp limit at step 508. If the monitored load voltage is less than the predetermined negative ramp limit then the monitored voltage has started to decrease and the overload status bit 304 should be set at step 506. In a preferred embodiment the negative ramp limit is set to 4.23V below top rail.

Figure 6:
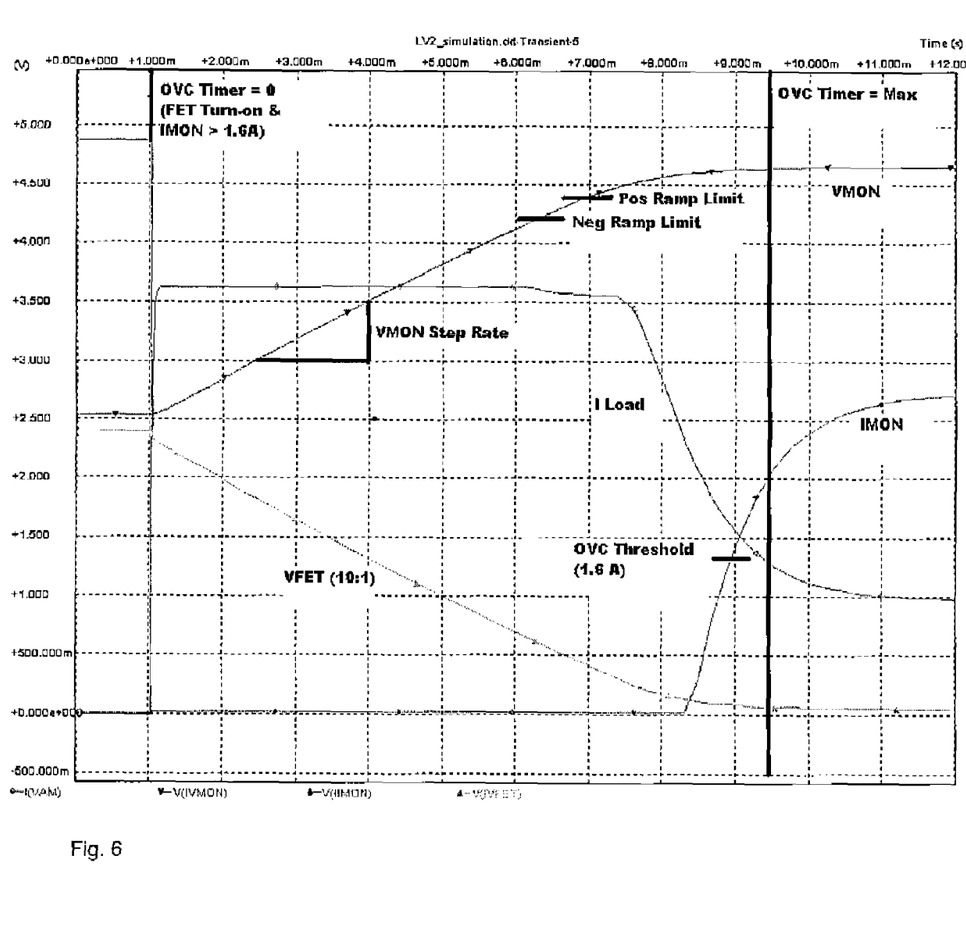
FIG. 6 is a graph illustrating monitored signal during turn on for a 1000 μF capacitor in parallel with a 24Ω resistor.

It should be appreciated that the vertical axis of the graph is scaled and offset to show the values seen by the current and voltage A/D converters 208, 210. These values are relative to the power rail.

Or gate 361 asserts the signal set overload set pulse 362 at step 506 in the event that either comparator, 320 or 322 indicates that the overload status bit 304 should be set.

FIG. 6 illustrates monitored current, monitored voltage during turn on of a load comprising a 1000 uF capacitor in parallel with a 24 Ohm resistor in a 24V embodiment.

It is to be recognised that various alterations, modifications, and/or additions may be introduced into the constructions and arrangements of parts described above without departing from the scope of the present invention as defined in the following claims.

The invention claimed is:

1. A method of generating an overload condition for an output module driving a load having a load current and a load voltage comprising the steps of:
    monitoring the load current at sample intervals;
    comparing the monitored load current to a predetermined load current threshold;
    starting an overload timer in the event that the timer is not running and the monitored load current is greater than said load current threshold;
    monitoring the load voltage at said sample intervals;
    generating a ramped load voltage waveform for reference purposes in dependence upon an initial load voltage and a predetermined step size load voltage in the event that the overload timer is running;
    generating the overload condition in the event that the monitored load voltage is less than said ramped load voltage reference waveform, the ramped load voltage is less than a predetermined positive ramp limit and the overload timer is running.

2. The method according to claim 1, in which the predetermined step size is a function of an initial value of said monitored load voltage when said overload time is started.

3. The method according to claim 1, further comprising the steps of:
    setting a voltage max flag in the event that the ramped load voltage reaches a predetermined positive max voltage;
    generating the overload condition in the event that the monitored load voltage is less than a predetermined negative ramp limit, the voltage max flag is set and overload timer is running.

4. The method according to claim 1, further comprising the step of:
    generating the overload condition in the event that the monitored load current is greater than said load current threshold and said timer exceeds a predetermined time limit.

* * * * *